United States Patent
Haartsen et al.

(10) Patent No.: US 6,519,236 B1
(45) Date of Patent: Feb. 11, 2003

(54) AUTOMATIC POWER CONTROL IN UNCOORDINATED FREQUENCY-HOPPING RADIO SYSTEMS

(75) Inventors: Jacobus Cornelis Haartsen, Borne (NL); Sven Mattisson, Bjärred (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/156,695

(22) Filed: Sep. 18, 1998

(51) Int. Cl.$^7$ ................................................. H04Q 7/00
(52) U.S. Cl. ........................ 370/332; 375/132; 455/522
(58) Field of Search ................................. 370/328, 331, 370/332, 349, 252; 375/102, 130, 132; 455/69, 522, 422, 67.1, 70, 127, 226.1, 225.2, 226.3, 296

(56) References Cited

U.S. PATENT DOCUMENTS

| | | |
|---|---|---|
| 4,222,115 A | 9/1980 | Cooper et al. |
| 4,613,990 A | 9/1986 | Halpern |
| 4,777,653 A | 10/1988 | Bonnerot et al. |
| 5,003,619 A | 3/1991 | Morris et al. |
| 5,220,678 A | 6/1993 | Feei |
| 5,396,516 A | 3/1995 | Padovani et al. |
| 5,465,398 A * | 11/1995 | Flammer ..................... 455/69 |
| 5,574,979 A | 11/1996 | West |
| 5,574,984 A | 11/1996 | Reed et al. |
| 5,579,373 A | 11/1996 | Jang |
| 5,673,307 A * | 9/1997 | Holland et al. |
| 5,689,815 A | 11/1997 | Yamazaki et al. |
| 5,768,684 A * | 6/1998 | Grubb et al. ............... 455/13.4 |
| 6,052,594 A * | 4/2000 | Chuang et al. ............. 455/450 |
| 6,072,990 A * | 6/2000 | Agrawal et al. ............. 455/69 |
| 6,137,994 A * | 10/2000 | Alterman et al. ............ 455/69 |
| 6,259,686 B1 * | 7/2001 | Blanc et al. |

FOREIGN PATENT DOCUMENTS

| | | |
|---|---|---|
| EP | 0462952 A1 | 12/1991 |
| EP | 0548939 A2 | 6/1993 |
| JP | 06350477 A | 12/1994 |
| WO | WO96/09696 | 3/1996 |

* cited by examiner

Primary Examiner—Melvin Marcelo
Assistant Examiner—Inder Pal Mehra
(74) Attorney, Agent, or Firm—Burns, Doane, Swecker & Mathis L.L.P.

(57) ABSTRACT

Transmission power in a frequency-hopping radio system that transmits packets from a sending radio unit to a receiving radio unit, wherein each packet includes an address designating the receiving radio unit, is controlled by measuring received signal strength of packets whose addresses were successfully received in the receiving radio unit, regardless of whether other portions of the respective packets were successfully received. An average signal strength value is generated from the received signal strength measurements. The mathematical difference between the average signal strength value and a target value associated with the receiving radio unit is then determined and used as a basis for deciding whether to send a power control message from the receiving radio unit to the sending radio unit. In order to provide a hysteresis in the power control process, a power control message is sent from the receiving radio unit to the sending radio unit if the mathematical difference is greater than a first decision boundary, or if the mathematical difference is less than a second decision boundary. The power control message may itself include the mathematical difference which, when received by the sending radio unit, is used as a basis for determining a transmission power level adjustment amount. The target value, against which the average signal strength value is compared, may be based on the receiver sensitivity adjusted to account for implementation losses and other inaccuracies.

34 Claims, 4 Drawing Sheets

AUTOMATIC POWER CONTROL IN UNCOORDINATED FREQUENCY-HOPPING RADIO SYSTEMS

BACKGROUND

The invention relates to radio systems that apply frequency hopping (FH) spread spectrum techniques. More particularly, the invention relates to power control techniques for use in radio systems in which several, uncoordinated and nonsynchronized FH systems cover the same area.

In the past few decades, progress in radio and Very Large Scale Integration (VLSI) technology has fostered widespread use of radio communications in consumer applications. Portable devices, such as mobile radios, can now be produced having acceptable cost, size and power consumption characteristics.

Although wireless technology is today focused mainly on voice communications (e.g., with respect to handheld radios), this field will likely expand in the near future to provide greater information flow to and from other types of nomadic devices and fixed devices. More specifically, it is likely that further advances in technology will provide very inexpensive radio equipment that can be easily integrated into many devices. This will reduce the number of cables currently used. For example, radio communication can eliminate or reduce the number of cables used to connect master devices with their respective peripherals.

The aforementioned radio communications will require an unlicenced band with sufficient capacity to allow for high data rate transmissions. A suitable band is the Industrial, Scientific and Medical (ISM) band at 2.4 GHz, which is globally available. The band provides 83.5 MHZ of radio spectrum.

To allow different radio networks to share the same radio medium without coordination, signal spreading is usually applied. In fact, the FCC in the United States currently requires radio equipment operating in the 2.4 GHz band to apply some form of spreading when the transmit power exceeds about 0 dBm. Spreading can be either at the symbol level by applying direct-sequence spread spectrum or at the channel level by applying frequency hopping (FH) spread spectrum. The latter is attractive for the radio applications mentioned above since it more readily allows the use of cost-effective radios.

The range of a radio link is generally determined by the transmit power of the sender in conjunction with the receiver sensitivity of the recipient, the receiver sensitivity being that received signal level for which acceptable reception is just possible. The receiver sensitivity is normally determined by the noise characteristics in the receiver which in turn depend on the bandwidth and allowable supply currents. Generally, the receiver sensitivity of a radio is fixed at the time of manufacturing. In contrast, the transmit (TX) power is usually a variable. Apart from hardware and power supply limitations, the maximum TX power is limited by government regulations. Even in an unlicenced band like the 2.4 GHz ISM band, maximum TX power is limited to 1 W. However, in the type of applications mentioned above, it is unnecessary to fix the TX power at it maximum. Rather, the TX power is regulated down such that the recipient receives a just sufficient amount of signal power for acceptable link quality. Reducing the TX power to the level just needed will reduce power consumption, thereby not only extending battery life, but also reducing interference. Reduction of interference is especially important if many uncoordinated radio networks share the same medium.

The TX power should always be controlled to an acceptable minimum in order to maintain acceptable link quality. In the type of applications mentioned above, the communicating radio units are peer units, and each seeks to reduce its TX power as much as possible. This results in a closed-loop power control algorithm, in which the recipient informs the sender to increase or decrease its TX power depending on the receive conditions. Such an automatic power control scheme has been described by G. H. Flammer, in U.S. Pat. No. 5,465,398, issued Nov. 7, 1995 ("Automatic Power Level Control of a Packet Communication Link"). This patent describes a procedure in which the TX power of the sender is regulated based on Received Signal Strength Indication (RSSI) in the recipient. In accordance with the described conventional technique, power control is relative in that the lowest RSSI value of a successfully-received packet is used as a reference value. "Successful" in this context means that the entire packet, including the payload data, has been received without error. For those packets that are (successfully) received with a higher RSSI level, the difference between the higher RSSI level and the reference value is determined and communicated to the sender, which can then reduce its TX power. Packets that are not successfully received are retransmitted at a higher TX power.

The problem with this scheme is that it does not distinguish between range and interference. The failure to successfully receive a packet can be attributed either to the signal level being too low, or to the interference level being too high. This is especially true in a situation in which many uncoordinated radio systems cover the same area: these systems will interfere with each other and packets will be lost due to collisions of different radio transmissions. Were an automatic power control strategy such as that described by Flammer to be employed under these conditions, all radio units would increase their power, which would only worsen the situation because the coverage area and therefore the number of mutual interferers would increase. In fact, the systems may become unstable. In an unlicenced band like the ISM band where operation of the radio units is uncoordinated and the radio units operate independently of each other, a power control strategy based on interference will result in an unfair domination of that system having the largest TX power.

An additional problem relates to the bursty interference conditions in FH systems: as the different systems hop uncoordinated through the spectrum, the interference only occurs if they happen, by chance, to use the same hop frequency at the same time. Due to the hopping, the interference conditions change for every hop. If the system hops at the packet rate, adjusting the power based on the successful reception of a packet is not very stable.

SUMMARY

The foregoing and other objects are achieved in transmission power control methods and apparatuses for use in a frequency-hopping radio system that transmits packets from a sending radio unit to a receiving radio unit, wherein each packet includes an address designating the receiving radio unit. In accordance with one aspect of the invention, the received signal strength of packets whose addresses were successfully received in the receiving radio unit is measured, regardless of whether other portions of the respective packets were successfully received; and an average signal strength value is generated from the received signal strength measurements. A mathematical difference between the average signal strength value and a target value associated with the receiving radio unit is then determined, and used as a basis for deciding whether to send a power control message from the receiving radio unit to the sending radio unit.

In another aspect of the invention, using the mathematical difference as a basis for deciding whether to send a power control message from the receiving radio unit to the sending radio unit comprises sending a power control message from the receiving radio unit to the sending radio unit if the mathematical difference is greater than a first decision boundary or less than a second decision boundary.

In yet another aspect of the invention, the power control message may include the mathematical difference.

In still another aspect of the invention, the power control message is received in the sending radio unit, which then adjusts its transmission power level unit by an amount based on the mathematical difference.

In yet another aspect of the invention, adjusting the transmission power level in the sending radio unit by an amount based on the mathematical difference includes determining whether the amount based on the mathematical difference would cause an adjusted transmission power level to exceed a predefined maximum transmission power level. If the amount based on the mathematical difference would cause the adjusted transmission power level to exceed the predefined maximum transmission power level, then the transmission power level in the sending radio unit is adjusted to be no more than the predefined maximum transmission power level.

In still another aspect of the invention, when the sending radio unit is at the predefined maximum TX power level, a control message is sent from the sending radio unit to the receiving radio unit informing that a maximum transmission power level has been reached.

In yet another aspect of the invention, the receiving radio unit responds to the control message from the sending radio unit informing that a maximum transmission power level has been reached, by sending no further power control messages to the sending radio unit that instruct the sending radio unit to further increase its transmission power level.

In still another aspect of the invention, adjusting the transmission power level in the sending radio unit by an amount based on the mathematical difference includes determining whether the amount based on the mathematical difference would cause an adjusted transmission power level to fall below a predefined minimum transmission power level. If the amount based on the mathematical difference would cause the adjusted transmission power level to fall below the predefined minimum transmission power level, then the transmission power level in the sending radio unit is adjusted to be no less than the predefined minimum transmission power level.

In yet another aspect of the invention, when the sending radio unit is at the predefined minimum TX power level, a control message is sent from the sending radio unit to the receiving radio unit informing that the minimum transmission power level has been reached.

In still another aspect of the invention, the receiving radio unit responds to the control message from the sending radio unit informing that a minimum transmission power level has been reached, by sending no further power control messages to the sending radio unit that instruct the sending radio unit to further decrease its transmission power level.

In yet another aspect of the invention, the target value associated with the receiving radio unit is based on the receiver sensitivity alone, or adjusted to account for implementation losses and other inaccuracies.

In still another aspect of the invention, generating the average signal strength value from the received signal strength measurements may include averaging signal strength values from the received signal strength measurements over a period of time extending over at least two frequency hops.

In yet another aspect of the invention, the power control message is transmitted on a control channel established between the receiving radio unit and the sending radio unit. Alternatively, it may be included in a return packet that is transmitted from the receiving radio unit to the sending radio unit.

In still another aspect of the invention, a highest permissible transmit power level is always used to send the power control message from the receiving radio unit to the sending radio unit. Alternatively, a first transmit power level is initially used to send the power control message from the receiving radio unit to the sending radio unit. The power control message transmit power level is then gradually increased from the first transmit power level to successively higher levels until a reception signal strength level at the receiving radio unit has reached a predefined acceptable level.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Figure 1:
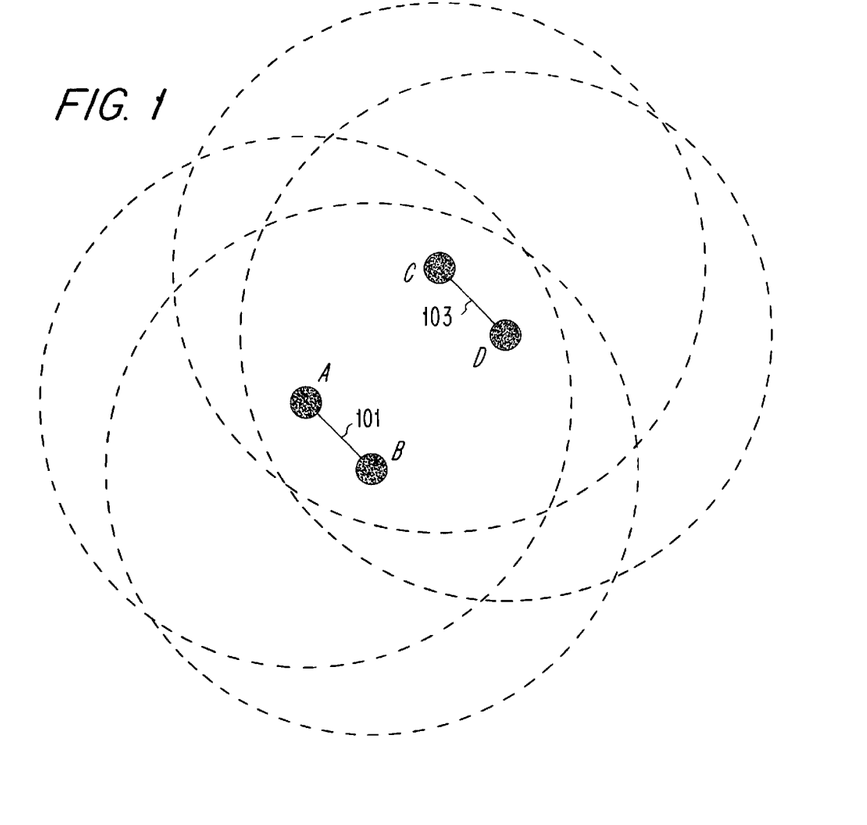
FIG. 1 depicts an interference scenario involving four radio units employing high transmission power levels.

FIG. 1 depicts two independent frequency hopping (FH) radio links 101, 103 operating in the vicinity of one another. Exemplary systems that utilizes such links are described in U.S. patent application Ser. No. 08/932,911, filed on Sep. 17, 1997 (Haartsen); and U.S. patent application Ser. No. 08/932,244, filed on Sep. 17, 1997 (Haartsen), the entire disclosures of which are hereby incorporated by reference herein in their entireties. The coverage range of each radio unit is indicated by a dashed circle. Units A and B communicate according to one FH scheme, while units C and D communicate according to another FH scheme. The two radio links 101, 103 are uncoordinated and occasionally make use of the same hop channel. Depending on the relative distances between the various units A, B, C, D, one or both transmissions may fail in that case. In the case illustrated in FIG. 1, the coverage areas are such that collisions will indeed occur. Units C and D are in the coverage range of units A and B, and vice versa; A and B will therefore interfere with C and D and vice versa.

Figure 2:
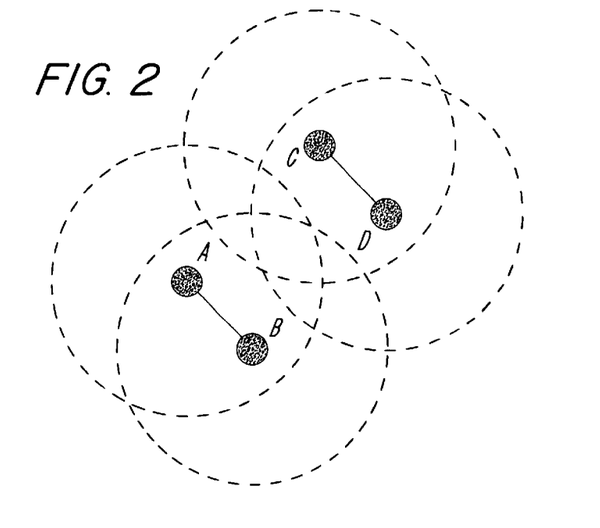
FIG. 2 depicts an interference scenario involving four radio units employing low transmission power levels.

FIG. 2 illustrates a case in which the TX powers of the radio units have been reduced, resulting in the smaller coverage areas depicted by the dotted lines in the figure. In this case, the signal strengths of the two systems are insufficient to disturb each other's intended received signals, and collisions will not occur even if the two links use the same hop channel simultaneously. This concept is generally used in cellular systems where channels are reused at geographic locations spaced sufficiently apart so that the mutual interference is too weak to disturb the intended signals.

It is clear from FIGS. 1 and 2 that the TX power should always be set as low as possible since this will increase overall capacity (reuse gain). In addition, it will reduce power consumption and thus extend battery life. However, the strategy for determining the power level control should not be based on the interference level experienced, because such a strategy can result in both transceiver pairs increasing their power. When this happens, interference is not reduced, and power consumption is increased.

In accordance with one aspect of the invention, power control is based on the absolute signal level received at each recipient. The TX power of the sending unit is adjusted to a level such that the received signal level is sufficiently large enough to overcome the noise generated in the receiver (receiver sensitivity) plus some margin.

Figure 3:
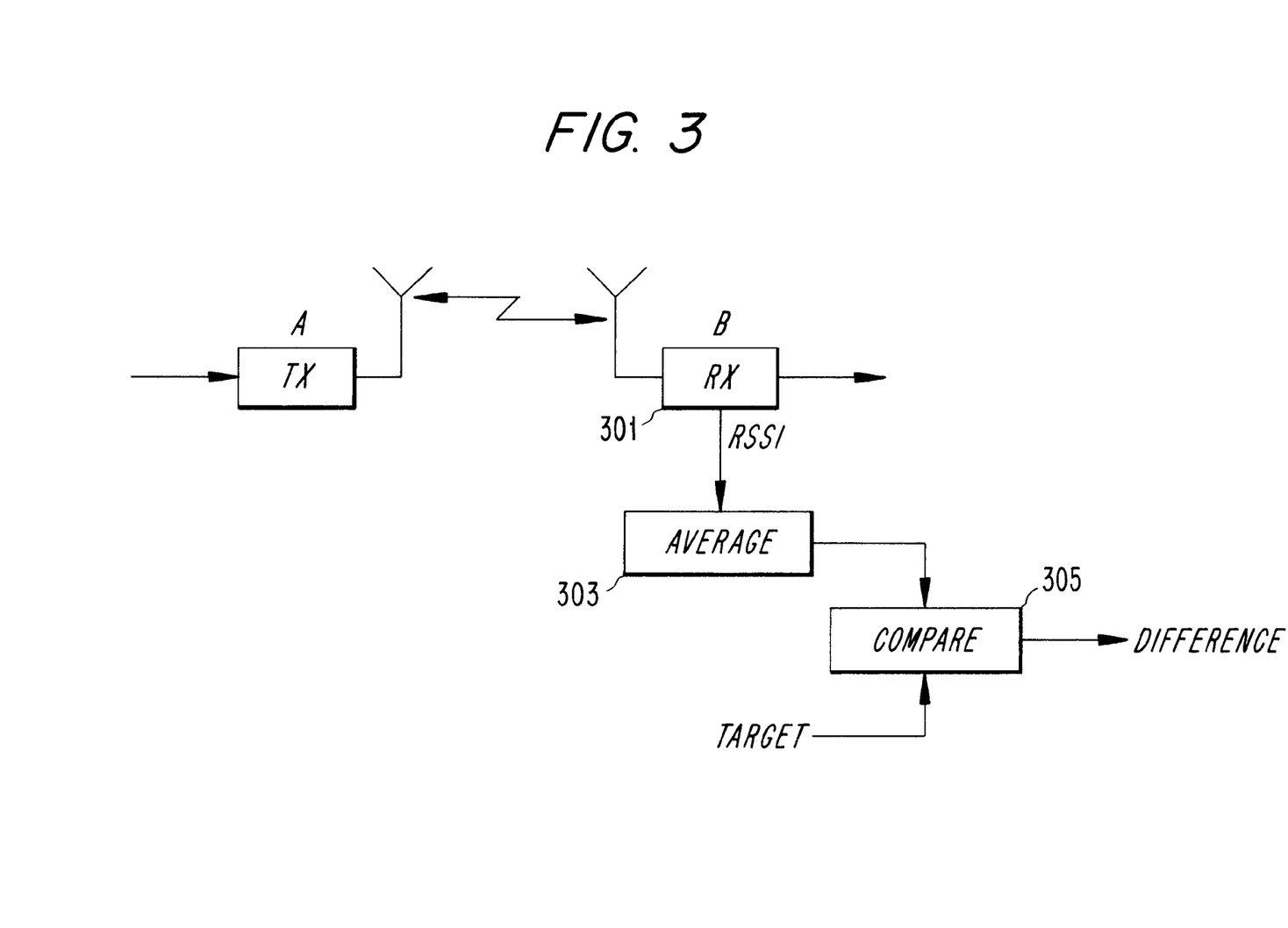
FIG. 3 is a block diagram depicting circuits at sender and recipient radio units for maintaining a power control loop in accordance with one aspect of the invention.

FIG. 3 is a block diagram depicting circuits at sender and recipient radio units for maintaining a power control loop in accordance with one aspect of the invention. A closed-loop power control strategy is used, in which, in one respect, unit A tells unit B what TX power to use based on signal strength measurements taken in unit A; and conversely, unit B tells unit A what TX power to use based on signal strength measurements taken in unit B. In order to facilitate an understanding of the invention, FIG. 3 depicts only those components involved in the procedure for controlling unit A's TX power. It will be readily understood that for controlling unit B's TX power, the same components and strategies would be employed, but with the roles of unit A and unit B being reversed.

Looking now at FIG. 3, unit B includes an RSSI measurement unit 301 that generates an RSSI value based on packets received from unit A. Each transmitted packet includes an address portion (e.g., in a header portion of the packet) that designates the intended recipient which, in this example, is unit B. Preferably, the only packets for which an RSSI measurement is made are those packets whose addresses are successfully received, regardless of whether other portions of the respective packets are successfully received. This is done in order to avoid having unit B regulate the power of unit A using packets erroneously received from a third unit (e.g., a nearby unit C). To facilitate a determination of whether a packet's address has been correctly received, forward error correction codes, such as header redundancy checks (HECs, which are the same as cyclic redundancy checks, or CRCs) may be (and typically are) added to the packet.

By only requiring that the address portion of the packet be successfully received, and not requiring that any other portion of the packet be successfully received, this aspect of the invention achieves an advantage in those situations in which the address, but not the packet payload (e.g., data) has been successfully received. (This can easily happen since packet headers are typically shorter than the payload portion, and include more forward error correction coding.) The advantage arises because by knowing at least that the packet was intended to be received by a particular receiving radio unit, that unit can still make an RSSI measurement on the packet, thereby enabling the power control mechanism to continue functioning (possibly increasing the transmit power level so that subsequent packet payloads will be received with fewer errors). By contrast, conventional techniques that make measurements only on those packets that were successfully received in their entirety, can break down when erosion of the transmission link between the sending and receiving radio units causes no packets to be successfully received. In this case, no signal strength measurements are made at all, so no power controls are generated and no closed-loop power control can be sustained in conventional systems.

Returning now to a discussion of FIG. 3, the packets are assumed to be sent on different hop channels, as is customary in FH radio systems. Different systems can have different relationships between the amount of time required to transmit one packet and the frequency hop dwell time (i.e., the amount of time that the FH radio systems spends communicating over any one of the various frequencies in the hop sequence). For example, the hop dwell time can be just long enough to permit the transmission of just one packet. Alternatively, the hop dwell time may be long enough to permit the transmission of two or more packets. In a preferred embodiment, unit B includes averaging circuitry 303 that accumulates the RSSI of packets received over many hops on different frequencies (e.g., over at least two, and in some embodiments all of the hops in a hop sequence), and determines an average RSSI. The averaging circuitry 303 may alternatively be hardwired components, programmed processing components, or a combination of both.

In another aspect of the invention, unit B further includes a comparator 305 that compares the average value determined in unit B with a target value, and determines therefrom a mathematical difference. In alternative embodiments, the mathematical difference can be represented by signals of any resolution, from 1 bit and higher, depending on the design of the overall system, and can represent positive as well as negative values. The target value used in the comparison can, for example, be the receiver sensitivity of unit B. In some embodiments, it may be advantageous to add a margin amount to the receiver sensitivity in order to determine the target value. Note that the receiver sensitivity may vary from unit to unit. More advanced units may have a lower receiver sensitivity and therefore require less TX power for the same range. In alternative embodiments, the target value can be based on parameters that are unrelated to receiver sensitivity.

The mathematical difference between the average RSSI value and the target value is then sent back to the sender (unit A in this example). This can, for example, be accomplished via a special control channel between unit A and B. Alternatively, the mathematical difference value may be piggy backed (i.e., included) in the return packet sent from unit B to unit A. If the mathematical difference is positive, the measured RSSI value is larger than that which is required for the current distance between units A and B. In this case, unit A may reduce its TX power. If the mathematical difference is negative, then unit A may increase its TX power. Note that unit A only adjusts its current TX power level by an amount based on the received mathematical difference value. The particular relationship between the adjustment amount and the mathematical difference value will be system dependent. Consequently, a full discussion of how to determine the adjustment amount based on the received mathematical difference value is beyond the scope of this disclosure. In general, unit B will only request a change in TX power when the mathematical difference has exceeded a certain margin. In this way a hysteresis results that prevents unit B from requesting small up and down steps continuously. Such a situation would result in a rather large overhead if explicit power messages are used.

Figure 4:
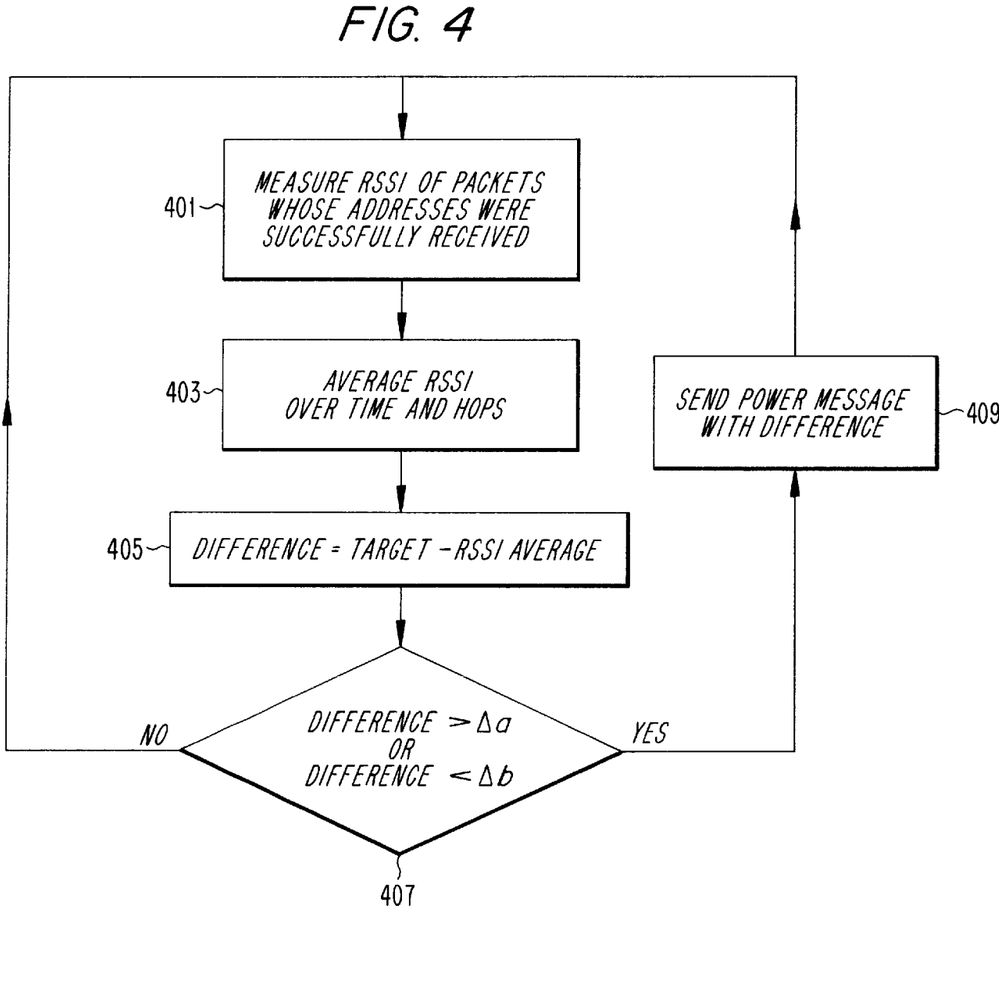
FIG. 4 is a flow diagram of a power control procedure performed at the recipient radio unit in accordance with one aspect of the invention.
Figure 5:
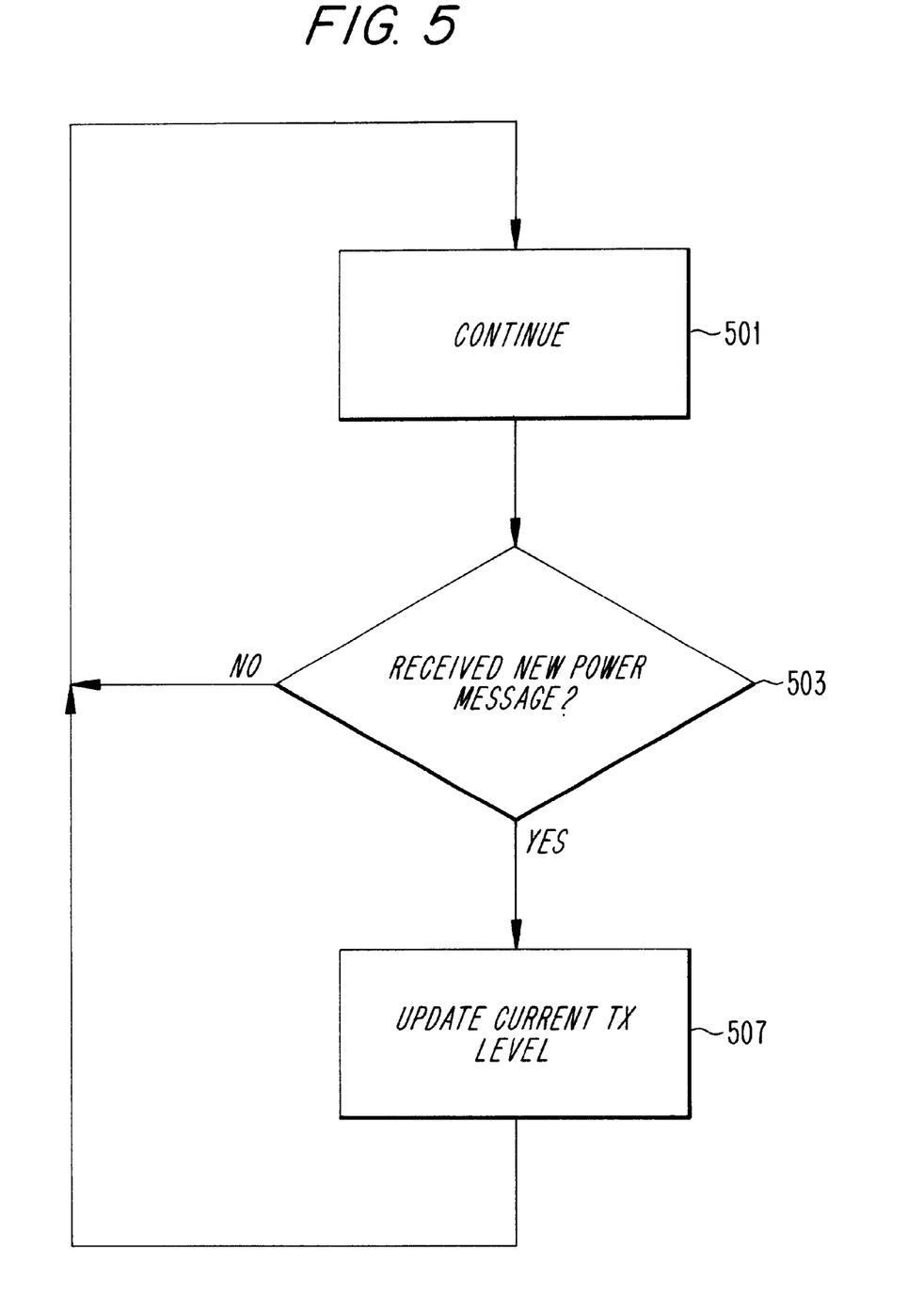
FIG. 5 is a flow diagram of power control procedure performed at the sender radio unit in accordance with one aspect of the invention.

Flow diagrams of the power control procedures performed at the recipient and sender are respectively shown in FIGS. 4 and 5. Looking first at FIG. 4, the RSSI of those packets whose addresses were successfully received is measured (step 401). These RSSI values are then averaged over a period of time that preferably extends over a large number of hop frequencies (step 403). The average RSSI value is then compared with a target value (e.g., by subtracting one from the other) in order to obtain a mathematical difference value (step 405). In some embodiments, the mathematical difference value may, at this point, be used directly to determine whether an adjustment in TX power should be made (i.e., based on whether the mathematical difference is equal to zero).

However, in preferred embodiments, a hysteresis is created by utilizing the decision boundaries $\Delta a$ and $\Delta b$ in a decision step (step 407). Specifically, if the mathematical difference value is alternatively greater than the boundary $\Delta a$ or less than the boundary $\Delta b$, then a power message including the mathematical difference value is sent to the sending unit (step 409). However, if neither of these test conditions is true, then no power message is transmitted. In either case, the entire process begins again at step 401 with the measurement of the RSSI for newly successfully received packets.

Looking now at FIG. 5, step 501 represents conventional processing that is performed by a radio unit. Such processing, of course, depends on the nature of the radio unit (e.g., whether it is wireless processing equipment, or some other type of equipment), and a discussion of this processing is outside the scope of this disclosure.

At some point, a determination is made as to whether a new power message has been received (step 503). If not, processing resumes at step 501.

However, if a new power message has been received, then the current TX level is adjusted by an amount determined by the contents of the new power message (step 507). In some embodiments, TX level cannot be adjusted above predefined maximum and/or below predefined minimum levels. In such cases, the adjustment step 507 includes a test to see if the intended adjustment would cause the adjusted TX level to either exceed the predefined maximum level, or fall below the predefined minimum level. In such cases, no adjustment beyond these limits is made. In such cases, it is preferable (although not required in all embodiments) for the sending radio unit to send a control message to the receiving radio unit informing that the maximum/minimum TX power level has been achieved. In response, the receiving radio unit should send no further power control messages that attempt to cause the sending radio unit to adjust the TX power level beyond the predefined limits. Specifically, when the receiving radio unit learns that the sending radio unit is at the predefined maximum TX power level, it will send no further control messages that attempt to further increase the TX power level beyond the predefined maximum TX power level. Similarly, when the receiving radio unit learns that the sending radio unit is at the predefined minimum TX power level, it will send no further control messages that attempt to further decrease the TX power level to a level that is lower than the predefined minimum TX power level.

Following the adjustment step 507, processing proceeds as usual (step 501).

The above-described procedure establishes a closed loop between sender and recipient for controlling the TX power of the sender. This procedure fails as soon as the loop is "broken". For example, if the link attenuation were suddenly to increase due to an object between sender and recipient, the recipient would have no ability to instruct the sender to increase its TX power. To account for this situation, two alternative solutions may be applied. In one embodiment, the control packet carrying the power control message is always sent at the highest allowable TX power. In an alternative embodiment, the power of the control packet carrying the power control message starts at a first power level. If the reception level at the receiving radio unit is not increased, this is presumably due to the sending unit not receiving the power control message. Therefore, starting at the first power level, the power of the control packet carrying the power control message is gradually increased until the reception level at the receiving radio unit has reached a satisfying level again. Note that this procedure is applied only for those packets that include power control messages. For all other messages, the other side has to request for the increase of TX power.

If a unit has several connections to different units (e.g., a master unit in communication with a number of slave units), it should support a power control loop to each unit independently. That is, the power of the packet transmission will depend on the distance and target reception value of each individual recipient. If a unit wants to send broadcast packets to all linked units, the broadcast message should either be sent at the maximum power level, or alternatively at the highest one of all of the various power levels required by the receiving units (i.e., the power level required by that unit having the weakest link between itself and the broadcasting unit).

The invention has been described with reference to a particular embodiment. However, it will be readily apparent to those skilled in the art that it is possible to embody the invention in specific forms other than those of the preferred embodiment described above. This may be done without departing from the spirit of the invention. The preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of controlling transmission power in a frequency-hopping radio system that transmits packets from a sending radio unit to a receiving radio unit, wherein each packet includes an address designating the receiving radio unit, the method comprising the steps of:

measuring received signal strength of packets whose addresses were successfully received in the receiving radio unit, regardless of whether other portions of the respective packets were successfully received;

generating an average signal strength value from the received signal strength measurements;

determining a mathematical difference between the average signal strength value and a target value associated with the receiving radio unit; and using the mathematical difference as a basis for deciding whether to send a power control message from the receiving radio unit to the sending radio unit.

2. The method of claim 1, wherein the step of using the mathematical difference as a basis for deciding whether to send a power control message from the receiving radio unit to the sending radio unit comprises the steps of:

sending a power control message from the receiving radio unit to the sending radio unit if the mathematical difference is greater than a first decision boundary; and sending the power control message from the receiving radio unit to the sending radio unit if the mathematical difference is less than a second decision boundary.

3. The method of claim 1, wherein the power control message includes the mathematical difference.

4. The method of claim 3, further comprising the steps of:

receiving the power control message in the sending radio unit; and adjusting a transmission power level in the sending radio unit by an amount based on the mathematical difference.

5. The method of claim 4, wherein the step of adjusting the transmission power level in the sending radio unit by an amount based on the mathematical difference comprises:

determining whether the amount based on the mathematical difference would cause an adjusted transmission power level to exceed a predefined maximum transmission power level;

if the amount based on the mathematical difference would cause the adjusted transmission power level to exceed the predefined maximum transmission power level, then adjusting the transmission power level in the sending radio unit to be no more than the predefined maximum transmission power level.

6. The method of claim 5, further comprising the step of:

sending a control message from the sending radio unit to the receiving radio unit informing that a maximum transmission power level has been reached.

7. The method of claim 6, further comprising the step of:

in the receiving radio unit, in response to the control message from the sending radio unit informing that a maximum transmission power level has been reached, sending no further power control messages to the sending radio unit that instruct the sending radio unit to further increase its transmission power level.

8. The method of claim 4, wherein the step of adjusting the transmission power level in the sending radio unit by an amount based on the mathematical difference comprises:

determining whether the amount based on the mathematical difference would cause an adjusted transmission power level to fall below a predefined minimum transmission power level;

if the amount based on the mathematical difference would cause the adjusted transmission power level to fall below the predefined minimum transmission power level, then adjusting the transmission power level in the sending radio unit to be no less than the predefined minimum transmission power level.

9. The method of claim 8, further comprising the step of:

sending a control message from the sending radio unit to the receiving radio unit informing that a minimum transmission power level has been reached.

10. The method of claim 9, further comprising the step of:

in the receiving radio unit, in response to the control message from the sending radio unit informing that a minimum transmission power level has been reached, sending no further power control messages to the sending radio unit that instruct the sending radio unit to further decrease its transmission power level.

11. The method of claim 1, wherein the target value associated with the receiving radio unit is based on the receiver sensitivity.

12. The method of claim 1, wherein the target value associated with the receiving radio unit is based on the receiver sensitivity adjusted to account for implementation losses and other inaccuracies.

13. The method of claim 1, wherein the step of generating the average signal strength value from the received signal strength measurements comprises the step of:

averaging signal strength values from the received signal strength measurements over a period of time extending over at least two frequency hops.

14. The method of claim 1, further comprising the step of:

when it is decided to send the power control message from the receiving radio unit to the sending radio unit, sending the power control message on a control channel established between the receiving radio unit and the sending radio unit.

15. The method of claim 1, further comprising the step of:

when it is decided to send the power control message from the receiving radio unit to the sending radio unit, including the power control message in a return packet that is transmitted from the receiving radio unit to the sending radio unit.

16. The method of claim 1, further comprising the step of:

when it is decided to send the power control message from the receiving radio unit to the sending radio unit, always using a highest permissible transmit power level to send the power control message from the receiving radio unit to the sending radio unit.

17. The method of claim 1, further comprising the step of:

when it is decided to send the power control message from the receiving radio unit to the sending radio unit, initially using a first transmit power level to send the power control message from the receiving radio unit to the sending radio unit, and then gradually increasing the power control message transmit power level from the first transmit power level to successively higher levels until a reception signal strength level at the receiving radio unit has reached a predefined acceptable level.

18. An apparatus for controlling transmission power in a frequency-hopping radio system that transmits packets from a sending radio unit to a receiving radio unit, wherein each packet includes an address designating the receiving radio unit, the apparatus comprising:

means for measuring received signal strength of packets whose addresses were successfully received in the receiving radio unit, regardless of whether other portions of the respective packets were successfully received;

means for generating an average signal strength value from the received signal strength measurements;

means for determining a mathematical difference between the average signal strength value and a target value associated with the receiving radio unit; and means for using the mathematical difference as a basis for deciding whether to send a power control message from the receiving radio unit to the sending radio unit.

19. The apparatus of claim 18, wherein the means for using the mathematical difference as a basis for deciding whether to send a power control message from the receiving radio unit to the sending radio unit comprises:

means for sending a power control message from the receiving radio unit to the sending radio unit if the mathematical difference is greater than a first decision boundary; and means for sending the power control message from the receiving radio unit to the sending radio unit if the mathematical difference is less than a second decision boundary.

20. The apparatus of claim 18, wherein the power control message includes the mathematical difference.

21. The apparatus of claim 20, further comprising:

means for receiving the power control message in the sending radio unit; and means for adjusting a transmission power level in the sending radio unit by an amount based on the mathematical difference.

22. The apparatus of claim 21, wherein the means for adjusting the transmission power level in the sending radio unit by an amount based on the mathematical difference comprises:

means for determining whether the amount based on the mathematical difference would cause an adjusted transmission power level to exceed a predefined maximum transmission power level;

means, response to a determination that the amount based on the mathematical difference would cause the adjusted transmission power level to exceed the predefined maximum transmission power level, for adjusting the transmission power level in the sending radio unit to be no more than the predefined maximum transmission power level.

23. The apparatus of claim 22, further comprising:

means for sending a control message from the sending radio unit to the receiving radio unit informing that a maximum transmission power level has been reached.

24. The apparatus of claim 23, further comprising:

in the receiving radio unit, means, responsive to the control message from the sending radio unit informing that a maximum transmission power level has been reached, for sending no further power control messages to the sending radio unit that instruct the sending radio unit to further increase its transmission power level.

25. The apparatus of claim 21, wherein the means for adjusting the transmission power level in the sending radio unit by an amount based on the mathematical difference comprises:

means for determining whether the amount based on the mathematical difference would cause an adjusted transmission power level to fall below a predefined minimum transmission power level;

means, responsive to a determination that the amount based on the mathematical difference would cause the adjusted transmission power level to fall below the predefined minimum transmission power level, for adjusting the transmission power level in the sending radio unit to be no less than the predefined minimum transmission power level.

26. The apparatus of claim 25, further comprising:

means for sending a control message from the sending radio unit to the receiving radio unit informing that a minimum transmission power level has been reached.

27. The apparatus of claim 26, further comprising the step of:

in the receiving radio unit, means, responsive to the control message from the sending radio unit informing that a minimum transmission power level has been reached, for sending no further power control messages to the sending radio unit that instruct the sending radio unit to further decrease its transmission power level.

28. The apparatus of claim 18, wherein the target value associated with the receiving radio unit is based on the receiver sensitivity.

29. The apparatus of claim 18, wherein the target value associated with the receiving radio unit is based on the receiver sensitivity adjusted to account for implementation losses and other inaccuracies.

30. The apparatus of claim 18, wherein the means for generating the average signal strength value from the received signal strength measurements comprises:

means for averaging signal strength values from the received signal strength measurements over a period of time extending over at least two frequency hops.

31. The apparatus of claim 18, further comprising:

means, responsive to a decision to send the power control message from the receiving radio unit to the sending radio unit, for sending the power control message on a control channel established between the receiving radio unit and the sending radio unit.

32. The apparatus of claim 18, further comprising:

means, responsive to a decision to send the power control message from the receiving radio unit to the sending radio unit, for including the power control message in a return packet that is transmitted from the receiving radio unit to the sending radio unit.

33. The apparatus of claim 18, further comprising:

means, responsive to a decision to send the power control message from the receiving radio unit to the sending radio unit, for always using a highest permissible transmit power level to send the power control message from the receiving radio unit to the sending radio unit.

34. The apparatus of claim 18, further comprising:

means, responsive to a decision to send the power control message from the receiving radio unit to the sending radio unit, for initially using a first transmit power level to send the power control message from the receiving radio unit to the sending radio unit, and then gradually increasing the power control message transmit power level from the first transmit power level to successively higher levels until a reception signal strength level at the receiving radio unit has reached a predefined acceptable level.

* * * * *